R. A. HADFIELD.
MANUFACTURE OF SHOVELS, SPADES, AND LIKE SHOVELING OR DIGGING DEVICES.
APPLICATION FILED MAY 25, 1920.
1,375,453.
Patented Apr. 19, 1921.
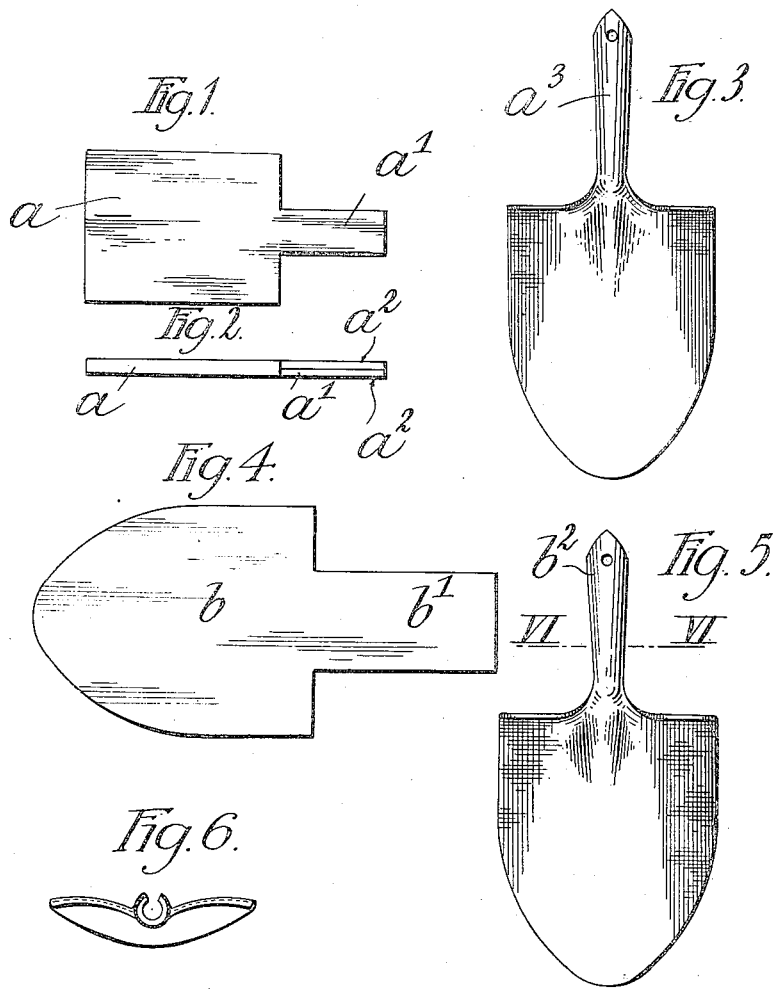
Inventor:
Robert A. Hadfield
By
Attorney

UNITED STATES PATENT OFFICE.

ROBERT ABBOTT HADFIELD, OF WESTMINSTER, ENGLAND.

MANUFACTURE OF SHOVELS, SPADES, AND LIKE SHOVELING OR DIGGING DEVICES.

1,375,453.　　　　　Specification of Letters Patent.　　Patented Apr. 19, 1921.

Application filed May 25, 1920. Serial No. 384,209.

*To all whom it may concern:*

Be it known that I, Sir ROBERT ABBOTT HADFIELD, baronet, F. R. S., a subject of the King of Great Britain and Ireland, residing at Westminster, England, have invented Improvements in the Manufacture of Shovels, Spades, and like Shoveling or Digging Devices, of which the following is a specification.

This invention has reference to that kind of shovels, spades and other hand operated articles used for shoveling, digging and like purposes, comprising a blade and a handle socket made in one piece of metal, and it has for its object to provide articles of this kind that shall be more serviceable and durable in use than those heretofore made.

For this purpose, a shovel, spade or like hand operated article (hereinafter referred to for brevity as a shovel) is made of manganese steel, preferably of the kind known commercially as Hadfield's manganese steel, such article being formed to the desired shape in one piece of metal with its socket by forging or bending and, after being shaped, it may be, quickly heated and allowed to cool, to remove hardness where necessary, is heated to a high temperature, say for example to about 1000° C., and quenched in water to toughen it, as will now be more particularly described with reference to the accompanying illustrative drawings, wherein Figure 1 shows in plan and Fig. 2 in edge view, a manganese steel slab or blank and Fig. 3 in face view, but to a smaller scale than Figs. 1 and 2, a shovel made therefrom by forging. Fig. 4 shows in plan, a shovel blank of sheet manganese steel and Fig. 5 in face view, a shovel made therefrom, Fig. 6 being a section on the line VI—VI of Fig. 5.

For the manufacture of a shovel such as shown in Fig. 3, there may be used, according to one way of carrying out the invention and as shown in Figs. 1 and 2, a slab or blank $a$ of manganese steel cast, forged or cut from a plate to a more or less rectangular shape with a shank or shaft $a'$ at one end and of a suitable thickness, say for example of about one inch. The shank or shaft is split as shown, so as to form double prongs or extensions $a^2$ for subsequent conversion into a socket for the reception of a handle, which may be of wood. The slab thus shaped is converted as for instance by forging under a hammer, or by rolling, while at a suitable forging temperature, say of about 1050° C. to 1080° C., into a sheet of the desired thickness to form a shovel blade or blank. The shovel blade or blank thus formed is then quickly heated to a temperature of say about 700° C. to 750° C. and allowed to cool, in order to reduce hardness due to hammering or rolling, after which it is cut and pressed to shape and its prongs bent to form a socket $a^3$ for the reception of a handle. The shovel blade thus formed, as shown in Fig. 3, is then heated to a high temperature, say for example to about 950° C. to 1050° C. but preferably to about 1000° C., for a few minutes only in order to avoid undue oxidation. The heated shovel blade is then quenched at about the temperature mentioned, in water to toughen it. The shovel blade is then ready to be fitted with a handle.

Or the shovel blade may be formed from a sheet of manganese steel made according to the invention described in the specification of my application for Letters Patent Serial No. 186,720, that is to say, by converting an ingot of manganese steel into a billet or slab, cutting said slab into shorter slab lengths, gradually reducing each slab length while at a suitable forging temperature into a sheet of the desired thickness, and annealing the resulting sheet. The sheet of annealed manganese steel thus formed is then cut to shape to form the desired shovel blade $b$, see Fig. 4 with an extension $b^1$ from which to form a socket for a handle, the plate then pressed to the desired dished shape and the extension $b^1$ bent to form a socket $b^2$ (see Figs. 5 and 6) and then heated to a high temperature and quenched in water to toughen it, as hereinbefore described for the forged shovel shown in Fig. 3.

The shovel blade or blank, in each case, without being heated to soften it and before it is cut and pressed to shape, may also be heated for a few minutes and water toughened as described. This operation is repeated after cutting and pressing and bending the blade or blank to shape.

What I claim is:—

1. The manufacture of a manganese steel shovel having its handle socket in one piece with its blade, said manufacture consisting in reducing a plate of manganese steel into a sheet of the desired thickness by forging, annealing the resulting sheet, cutting the sheet to shape to form the desired shovel blade with shank for handle socket, bending the sheet to form the desired shovel blade with handle socket, heating the said blade and socket quickly to a high temperature and quenching it quickly in water.

2. The manufacture of a manganese steel shovel by forging a slab of manganese steel at a temperature of from about 1050° C. to 1080° C. into a sheet of a suitable thickness to form the required shovel blade and socket, then quickly heating the sheet to a temperature of about 700° C. to 750° C. and allowing it to cool, cutting the said sheet to shape to form the required blade with extension for a handle socket, pressing the blade to the desired shape and bending the extension to form the required socket, heating the said blade with socket to a temperature of about 950° C. to 1050° C. and quenching it in water.

3. The manufacture of a manganese steel shovel by forging a slab of manganese steel at a temperature of from about 1050° C. to 1080° C. into a sheet of a suitable thickness to form the required shovel blade and socket, then quickly heating the sheet to a temperature of about 700° C. to 750° C. and allowing it to cool, cutting the said sheet to shape to form the required blade with extension for a handle socket, pressing the blade to the desired shape and bending the extension to form the required socket, heating the said blade with socket to a temperature of about 950° C. to 1050° C. for a few minutes only and quenching it in water.

Signed at London in the county of London, England, this twenty-ninth day of April, 1920.

ROBERT ABBOTT HADFIELD.